United States Patent [19]

Gill et al.

[11] 4,340,920

[45] Jul. 20, 1982

[54] MINE VEHICLE SAFETY APPARATUS

[75] Inventors: Ronald P. Gill, Nashville; Dempsey G. Tucker, Mascoutah; John E. Hull, Jr., Sparta, all of Ill.

[73] Assignee: Peabody Coal Company, St. Louis, Mo.

[21] Appl. No.: 249,078

[22] Filed: Mar. 30, 1981

[51] Int. Cl.³ .............................................. H02H 3/00
[52] U.S. Cl. ........................................ 361/49; 191/8; 361/42
[58] Field of Search .................. 361/49, 50, 42; 191/8

[56] References Cited

U.S. PATENT DOCUMENTS 1,324,903  12/1919  Klink ...................................... 361/49

OTHER PUBLICATIONS

General Informaltional Materials on Femco GM 1000 Ground Sentinel II, 2/3/76, National Mine Service Co., Pittsburgh, PA.
Schematic of ground monitor system for A.C. power systems utilizing Femco Ground Sentinel II.

Primary Examiner—Reinhard J. Eisenzopf
Attorney, Agent, or Firm—Senniger, Powers, Leavitt and Roedel

[57] ABSTRACT

A mine safety system for use with a direct current power supply delivering power via a pair of conductors to the direct current load components of mining apparatus which includes a conductive frame electrically isolated from ground and at least one of the conductors. In the safety system, an alternating current generator transmits a predetermined frequency signal over the pair of conductors to the mining apparatus. A filter which passes the predetermined frequency signal is disposed at the mining apparatus in a shunt circuit with the load components, the filter thereby being connected to the generator. Circuitry monitors the impedance of the electrical load on the generator at the predetermined frequency and a contactor responsive thereto stops the delivery of power from the power supply to the mining apparatus upon the impedance of the electrical load on the generator at the predetermined frequency exceeding a predetermined level which exceeds the impedance of the shunt combination of the filter and load components. Switching circuitry disconnects the filter from the generator in response to the flow of significant current from one of the conductors to the mining apparatus frame, thereby increasing the impedance of the electrical load on the generator at the predetermined frequency to above the predetermined level, whereby delivery of power from the power supply to the mining apparatus is stopped.

9 Claims, 3 Drawing Figures

MINE VEHICLE SAFETY APPARATUS

BACKGROUND OF THE INVENTION

The present invention relates broadly to safety apparatus for electric power systems, and more specifically to such apparatus for use with underground mining apparatus, such as coal transport or shuttle cars, which are electrically powered via conductors from a remote power supply. Particularly, the invention functions to cut off direct current supplied to a mine car if a conductive portion of the car body or frame has become effectively shorted to a power conductor.

In underground mining apparatus such as transport cars which are electrically powered via a cable from a remote power supply, a potential hazard occurs if one of the power conductors in a cable or one of the load elements of the car should become electrically shorted to a conductive portion of the vehicle body or frame. Because the vehicle body or frame is not earth grounded, circuit breakers will not be actuated under these conditions, and the vehicle body will become electrically hot, with attendant hazard to workers in the mine.

In the operation of mine cars it is desirable to disconnect the power supply from the cable on the loss of continuity in the electrical cable which delivers power to the car. National Mine Service Co. of Pittsburgh, Pa. manufactures and distributes circuitry, known by the tradename Femco GM1000 Ground Sentinel II, for monitoring three-phase alternating current power cables for continuity and for disconnecting the power supply on the occurrence of a discontinuity. The Ground Sentinel II includes a 4 KHz alternating current generator, circuitry associated with the generator to sense the impedance of the generator's load at 4 KHz, and a switched output which causes a contactor to disconnect the power supply when the generator's load impedance raises above a predetermined level. In use with a three-phase alternating current power system, the generator and monitoring circuitry are connected to the power cable at the power station by a three phase filter and to the car via a pilot or ground wire. A second three-phase filter at the car couples the car body to the cable. If any cable conductor should open, the load impedance for the 4 KHz generator increases; when this condition is sensed the circuit drives the contactor, thereby disconnecting the three phase power supply. The Femco circuit does not monitor the cable for short circuits.

SUMMARY OF THE INVENTION

Among the several objects of this invention may be noted the provision of an improved mine safety system for use with a direct current power system in which a direct current supply delivers power via a pair of conductors to the direct current load components of mining apparatus (such as a coal transport car); the provision of a mine safety system, for use with a direct current power system, which stops delivery of power to the mining apparatus on a short-circuit of the power cable or mining apparatus load components to the frame of the mining apparatus; the provision of such a mine safety system which stops delivery of power to the mining apparatus on such a short-circuit condition without requiring an additional, signal cable between the power source and the mining apparatus; and the provision of circuitry which may be utilized with the Femco Ground Sentinel II, or similar circuitry, to provide a mine safety system to stop delivery of power to the mining apparatus in a direct current power system upon the occurrence of a short circuit.

Briefly, the invention comprises a mine safety system for use with a direct current power supply delivering power via a pair of conductors to the direct current load components of a mining apparatus, the mining apparatus having a conductive frame electrically isolated from ground and at least one of the conductors. The mine safety system includes a generator for transmitting an alternating current signal of a predetermined frequency over the pair of conductors to the mining apparatus. A filter is provided at the mining apparatus in a shunt circuit with the load components, the filter thereby being connected to the generator. The filter passes the predetermined frequency signal. Impedance monitoring circuitry monitors the impedance of the electrical load on the generator at the predetermined frequency. A contactor, responsive to the impedance monitoring circuitry, stops the delivery of power from the power supply to the mining apparatus upon the impedance of the electrical load on the generator at the predetermined frequency exceeding a predetermined level which exceeds the impedance of the shunt combination of the filter and load components. Switching circuitry disconnects the filter from the generator in response to the flow of significant current from one of the conductors to the mining apparatus frame, thereby increasing the impedance of the electrical load on the generator at the predetermined frequency to above the predetermined level, whereby delivery of power from the power supply to the mining apparatus is stopped.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
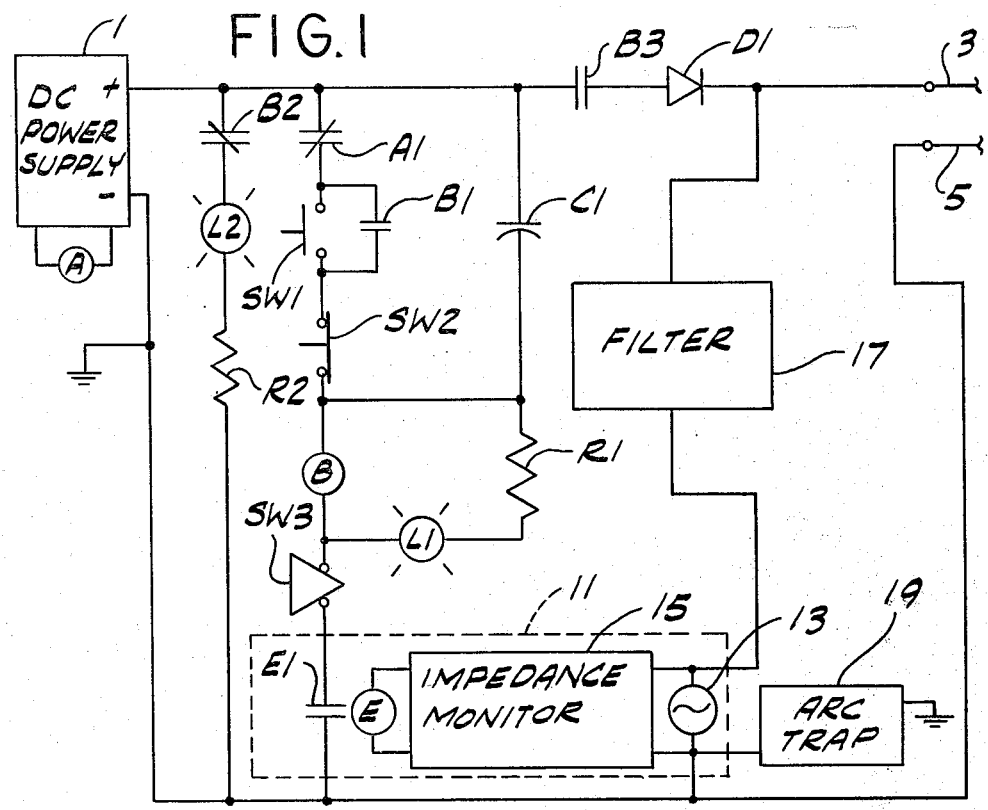
FIG. 1 is a wiring schematic for a central power station for mine shuttle cars which includes mine safety circuitry embodying the present invention.
Figure 2:
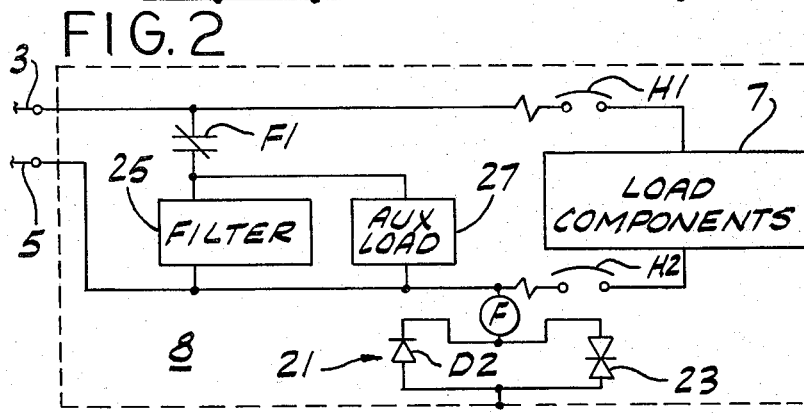
FIG. 2 is a wiring schematic for a mine shuttle car in which additional mine safety circuitry is incorporated.
Figure 3:
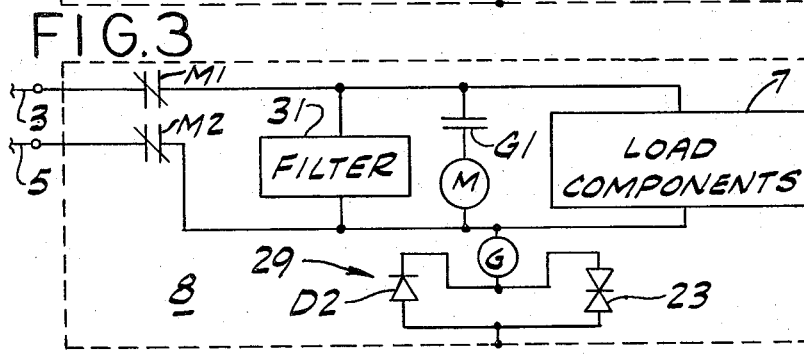
FIG. 3 is a schematic of alternate wiring for a mine shuttle car.

The mine safety system of the invention is used with a conventional direct current power system for mining apparatus, which power system includes a direct current negative-grounded power supply 1 (see FIG. 1). Power supply 1 delivers power from a power station via a pair of conductors or power cables 3 and 5, conductor 3 being connected to the positive terminal of the supply and conductor 5 being connected to the negative terminal. As shown in FIG. 2 (and in the alternative embodiment of FIG. 3), the power is delivered by the conductors to direct current load components, designated by the numeral 7, of a remotely-located coal transport or shuttle car 8, which load components typically include a d.c. electric motor, control circuitry, etc. The shuttle car has a conductive metal body or frame, designated by dashed lines 9, which is electrically isolated from ground and is also normally electrically isolated from at least positive conductor 3, as shown in FIGS. 2 and 3.

At the power station (see FIG. 1), the d.c. power supply is connected to power station mine safety circuitry which includes an overcurrent sensing coil A which actuates a set of normally closed control contacts A1. Contacts A1 are connected to the positive side of the power supply and are in series with a normally open momentary-contact switch SW1, for start-up. Switch SW1 is connected to a normally closed momentary-release switch SW2 for shut-down, which in turn is connected to a contactor or relay coil B which controls a set of normally open holding contacts B1 in shunt with switch SW1. Relay coil B is also connected to a plug-type disable switch SW3, which is interconnected to the negative side of the power supply via a set of normally open contacts E1 within a control circuit 11, whose function will be described in detail below. A capacitor C1 is connected from the positive side of the power supply to the common terminal of switch SW2 and coil B. A series-connected limiting resistor R1 and red signal lamp L1 are connected in parallel with relay coil B.

In addition to contacts B1, relay coil B also controls a set of normally closed contacts B2 which are connected in series with a limiting resistor R2 and a green signal lamp L2 between the positive and negative terminals of the supply. Moreover, relay coil B controls another set of normally open holding contacts B3 which are in series with a diode D1. When contacts B3 are closed, they and diode D1 connect the positive side of the power supply to positive conductor 3, the anode of the diode being connected to the power supply by contacts B3.

In a first embodiment, control circuit 11 is the aforementioned circuitry manufactured and distributed under the trade designation Femco GM1000 Ground Sentinel II by National Mine Service Co., P.O. Box 34050-T, Pittsburgh, Pa. 15230, which circuitry heretofore has been used with three-phase alternating current power systems. This control circuit, described schematically below, includes an alternating current generator 13 which provides an alternating current signal of a predetermined frequency of 4 KHz. An impedance monitor 15 within the control circuit constitutes means for monitoring the impedance of the electrical load on the generator at the 4 KHz frequency. A contactor or relay coil E is energized by the impedance monitor to maintain contacts E1 closed unless the impedance exceeds a predetermined impedance level; then the contacts are opened. The predetermined impedance level is generally on the order of 10 ohms, being adjustable from 2 to 18 ohms. The control circuit is powered by a 120 V a.c. supply, not shown.

Alternating current generator 13 is connected in series with a direct current blocking filter 17 between power conductors 3 and 5 at the power station. Thus it is parallel-connected with the direct current power supply to transmit the 4 KHz signal to the mine vehicle via the pair of conductors. Filter 17, distributed by National Mine Service Co. as an accessory (Part No. FI2536) to control circuit 11, is a three-phase highpass filter which presents a low impedance to 4 KHz alternating current but blocks direct current (and substantially blocks 60 Hz a.c.). Heretofore, the filter has been utilized for connecting the three phases of a three-phase power cable to a single monitoring input, or the like. In this use, the three leads of the filter conventionally connected to the three-phase cable are connected together, essentially transforming it into a single-phase filter.

Because filter 17 passes the 4 KHz signal, it and the generator constitute means for transmitting an alternating current signal of a predetermined frequency over the pair of conductors to the mine vehicle. That terminal of generator 13 connected to negative power conductor 5 is connected to ground through a surge-protection device 19 also distributed by National Mine Service Co., under the trade designation Arc Trap.

Diode D1 is disposed between contacts B3 and filter 17 to avoid d.c. power supply 1 and its associated circuitry from constituting a low impedance shunt across generator 13. By so connecting the diode, an increase in the impedance of the load so that it exceeds the predetermined impedance level at which the control circuit trips to reopen contacts E1 will be sensed by monitor 15. The monitor is thus not significantly affected by the impedance of the power supply.

FIG. 2 of the drawings shows one embodiment of remote vehicle mine safety circuitry at a mine shuttle car. The shuttle car is, in this embodiment, one such as manufactured by Joy Manufacturing Co. in its Franklin, Pa. plant. The conductive frame of the car, represented by dashed line 9 around the circuit elements, is isolated from earth ground and from positive conductor 3, while a conductive circuit 21 connects negative conductor 5 to conductive frame 9. Conductive circuit 21 is comprised of the parallel combination of a power diode D2 and a volt trap 23 (for overvoltage protection of the diode) in series with a coil F of a mercury contact relay. The anode of diode D2 is connected to the frame and permits significant current flow only from the conductive frame to the negative conductor, and blocks current flow from the negative conductor to the frame. Diode D2 and volt trap 23 conventionally serve as part of a grounding assembly on Joy Manufacturing Co.'s d.c. powered shuttle cars. The car frame is normally isolated from at least the positive conductor. Moreover, diode D2 effectively isolates negative conductor 5 from the frame except when the frame has a positive potential relative to the negative conductor.

A set of contacts F1 of the mercury contact relay are controlled by coil F and serve as a normally closed switch. Contacts F1 are connected in series with a highpass filter 25 between conductors 3 and 5, providing a shunt circuit across load components 7. Contacts F1 and filter 25 are thus connected to generator 13 by the pair of conductors. Filter 25, like blocking filter 17, is a three-phase filter (Part No. FI2536) made by National Mine Service Co., with the three phases of the filter connected together. The filter passes the 4 KHz signal of the generator and thereby presents a low impedance to the signal. The shunt combination of highpass filter 25 and load components 7 in series combination with d.c. blocking filter 17 have an impedance at the 4 KHz frequency which is less than the predetermined impedance level at which impedance monitor 15 trips to reopen contacts E1. An auxiliary load 27 of relatively high impedance to the 4 KHz signal, such as control and lighting components, may be connected in parallel with filter 25. As shown in FIG. 2, overcurrent circuit breakers H1 and H2 are optionally provided in conductors 3 and 5.

In operation of the mine safety system, delivery of power to the shuttle car via conductors 3 and 5 is started by energizing control circuit 11. During normal operation neither positive conductor 3 nor load components 7 are grounded to vehicle frame 9 and no circuit discontinuities are present, and thus contacts F1 will be closed so that filter 25 will present a low impedance load to control circuit generator 13. Impedance monitor 15 will sense the low impedance load and energize coil E, thereby closing contacts E1. Next, momentary contact switch SW1 is pressed, with disable plug switch SW3 in place. The resulting current through coil B closes contacts B3 to permit current to flow from d.c. supply 1 to the mine vehicle and closes contacts B1 to lock the system on. Lamp L1 will then be on, indicating power is being supplied to the car. In addition, contacts B2 open to turn off lamp L2.

If the positive conductor or the load components in a conventional mine vehicle should accidentally short to the frame of the vehicle, or if any other external source of voltage should come into contact with the frame the frame would be "hot", that is, have a positive potential relative to earth ground, which is a very dangerous condition. However, the mine safety system of the invention eliminates this hazard. Conductive circuit 21, including coil F and diode D2, provides a conductive current path between the conductors via the frame when the positive conductor is shorted to the frame. The presence of significant current through this path energizes coil F, causing contacts F1 to disconnect filter 25 from the generator, which causes the impedance of the electrical load on the generator at the 4 KHz frequency to exceed the predetermined impedance level at which impedance monitor 15 trips and reopens contacts F1. The conductive circuit, including coil F series-connected in the conductive circuit, and contacts F1, constitute means, responsive to the flow of significant current from one of the conductors to the vehicle frame, for disconnecting filter 25 from the generator, thereby to increase the impedance of the electrical load on the generator at the 4 KHz frequency to above the predetermined impedance level. Coil F and contacts F1 also constitute switching means for disconnecting filter 25 from the generator in response to the presence of a significant current in conductive circuit 21. In this embodiment, the switching means constitutes means for opening the shunt circuit, which circuit includes filter 25.

When the filter is disconnected, delivery of power to the mining vehicle from the power supply is stopped, because impedance monitor 15 causes contacts E1 to open and the resulting deenergization of coil B then causes contacts B3 to open. The contactor comprising coil E and contacts E1 within control circuit 11, along with relay coil B and its contacts B3, thus constitute means for stopping the delivery of power from the power supply to the mine vehicle upon the impedance of the electrical load on the generator at the 4 KHz frequency exceeding a predetermined level, the predetermined level exceeding the impedance of the shunt combination of filters and load components. Thus, contacts B3 open in response to the impedance monitor upon the impedance of the electrical load on the generator at 4 KHz exceeding a predetermined level. When contacts B3 open, the supply of d.c. power to the car is stopped, the frame of the mine vehicle is no longer "hot", and the hazardous condition is eliminated. At the same time contacts B2 close, energizing lamp L2, which indicates power supply 1 is energized, but power is not being supplied to the car. Power delivery to the car cannot be restarted until the short to the frame is corrected.

If either of the conductors should open during operation of the mine vehicle, the resulting large generator load impedance will be sensed by the impedance monitor 15 and contacts E1 will be opened, causing power to be cut off to the vehicle. Again, power delivery to the car cannot be restarted until the condition is corrected.

In the alternative embodiment shown in FIG. 3, the metal frame 9 of the car is likewise connected to negative conductor 5 by a conductive circuit 29. Circuit 29 includes a relay coil G and parallel-connected diode D2 and volt trap 23, the diode being connected at its anode to vehicle frame 9 and at its cathode to relay coil G, the other side of coil G being connected to negative conductor 5. A set of normally open relay contacts G1 controlled by coil G are connected in series with a trip coil M between conductors 3 and 5. A filter 31 similar to filter 25 is also connected between the two conductors, presenting a low impedance to generator 13. Circuit breakers M1 and M2 controlled by coil M are connected in the positive and negative conductors, respectively, on the power supply side of load components 7, filter 31, contacts G1 and coil M. Circuit breakers M1, M2 constitute switching means for disconnecting the electrical load, including load components 7 and filter 31, from the generator in response to the presence of a significant current in conductive circuit 29.

If, in operation of the car wired as shown in FIG. 3, the positive conductor 3 or load components 7 should short to the car's conductive frame 9, current will flow from the positive conductor through the frame and conductive circuit 29, including coil G, to the negative conductor. Contacts G1 are thereby closed, causing trip coil M to open breakers M1 and M2, disconnecting filter 31 from the generator. Impedance monitor 15 then senses a very high impedance, exceeding the predetermined level at which the monitor trips, and delivery of power to the conductors is then stopped by opening of contacts E1 and the resulting opening of contacts B3.

A principal feature of the invention is the avoidance of the potential hazard caused by a "hot" vehicle frame, by cutting off power at the power supply when this condition exists. The mine safety system also cuts off power if a power conductor opens, which may in some cases likewise be a hazard. The safety circuitry of the invention does not require the provision of a signal cable between the power source and mine car. Such a "wireless" system is of increasing advantage with increasing mine shaft lengths. Another advantage of the invention is the use of available control components, such as the Femco Ground Sentinel and associated filters.

Though in the two embodiments illustrated monitoring is performed by the Femco Ground Sentinel II utilizing the associated filters, any similar circuitry and filters may be utilized. In the embodiments shown the negative conductor is used as the common, but it will be clear to persons skilled in the art that a positive common system may be used with obvious modifications which are obvious given the disclosure of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A mine safety system for use with a direct current power supply delivering power via a pair of conductors to the direct current load components of mining apparatus which includes a conductive frame electrically isolated from ground and normally isolated from at least one of the conductors, comprising:

means for transmitting an alternating current signal of a predetermined frequency over the pair of conductors to the mining apparatus;

a filter at the mining apparatus in a shunt circuit with the load components and thereby being connected to said transmitting means, the filter passing the predetermined frequency signal;

means for monitoring the impedance of the electrical load on the transmitting means at the predetermined frequency;

means responsive to the monitoring means for stopping the delivery of power from the power supply to the mining apparatus upon the impedance of the electrical load on the transmitting means at the predetermined frequency exceeding a predetermined level, said predetermined level exceeding the impedance of the shunt combination of the filter and load components; and means responsive to the flow of significant current to the mining apparatus frame for disconnecting said filter from said transmitting means, thereby to increase the impedance of the electrical load on the transmitting means at the predetermined frequency to above the predetermined level, whereby delivery of power from the power supply to the mining apparatus is stopped.

2. A system as set forth in claim 1 wherein the disconnecting means includes a conductive circuit connecting one of the conductors to the conductive frame, thereby providing a conductive current path between the conductors via the frame on shorting of the other of the conductors to the frame, and switching means for disconnecting the filter from the transmitting means in response to the presence of a significant current in said conductive circuit.

3. A system as set forth in claim 2 wherein the switching means includes means for opening the shunt circuit.

4. A system as set forth in claim 2 wherein the disconnecting means includes a relay having a coil series-connected in said conductive circuit and a set of contacts for disconnecting the filter from the transmitting means.

5. A system as set forth in claim 2 wherein the transmitting means comprises an alternating current generator parallel-connected with the direct current power supply.

6. A mine safety system for use with a direct current power supply delivering power from a power station via a pair of conductors to the direct current load components of a remote mining apparatus, such as a transport car, which includes a conductive frame electrically isolated from ground and normally isolated from at least one of the conductors, comprising:

power station mine safety circuitry including means for transmitting an alternating current signal of a predetermined frequency over the pair of conductors to the mining apparatus, means for monitoring the impedance of the electrical load on the transmitting means at the predetermined frequency, and means for stopping the delivery of power from the power supply to the mining apparatus upon the impedance of the electrical load on the transmitting means at the predetermined frequency exceeding a predetermined level; and remote mine safety circuitry including a filter in a shunt circuit with the load components and thereby connected to said transmitting means, the shunt combination of the filter and load components having an impedance at the predetermined frequency less than said predetermined level, a conductive circuit connecting one of the conductors to the conductive frame, thereby providing a conductive current path between the conductors via the frame on shorting of the other of the conductors to the frame, and switching means for disconnecting the filter from said transmitting means in response to the presence of a significant current in the conducting means, whereupon the impedance of the electrical load on the transmitting means at the predetermined frequency exceeds the predetermined level, and delivery of power from the power supply to the mining apparatus is stopped.

7. A system as set forth in claim 6 wherein the switching means includes means for opening the shunt circuit.

8. A system as set forth in claim 6 wherein the conductive circuit includes a diode which permits significant current flow only from the conductive frame to that conductor connected to the conductive circuit.

9. A mine vehicle safety system for use with a direct current power supply delivering direct current, via a pair of conductors, from a power station to the direct current load components of a remote mining vehicle having a conductive frame electrically isolated from ground and normally isolated from at least one of the conductors, comprising:

power station mine safety circuitry including an alternating current generator, parallel connected with the direct current power supply, which produces an alternating current signal of a predetermined frequency and transmits the signal to the mining vehicle via the pair of conductors;

means for monitoring the impedance of the electrical load on the generator; and a contactor having contacts connecting the power supply to the conductors, the contacts opening in response to the monitoring means upon the impedance of the electrical load on the generator at the predetermined frequency exceeding a predetermined level; together with remote vehicle mine safety circuitry including a highpass filter in a shunt circuit with the remote vehicle load components and thereby connected to the generator by the pair of conductors, the shunt combination of the filter and load components having an impedance at the predetermined frequency less than said predetermined level; and a conductive circuit connecting one of the conductors to the remote vehicle frame means and thereby providing a conductive current path between the conductors via the frame on shorting of the other of the conductors to the frame means, the conductive circuit including a coil of a relay;

said relay having contacts which open in response to the presence of a significant current in the coil thereby to disconnect the filter from the generator, whereupon the impedance of the electrical load on the generator at the predetermined frequency exceeds the predetermined level and the contacts of the contactor at the power station open, discontinuing the delivery of power.

* * * * *